July 1, 1930.  H. C. RIES  1,768,633
PISTON FOR OIL WELL CIRCULATION PUMPS
Filed June 3, 1929
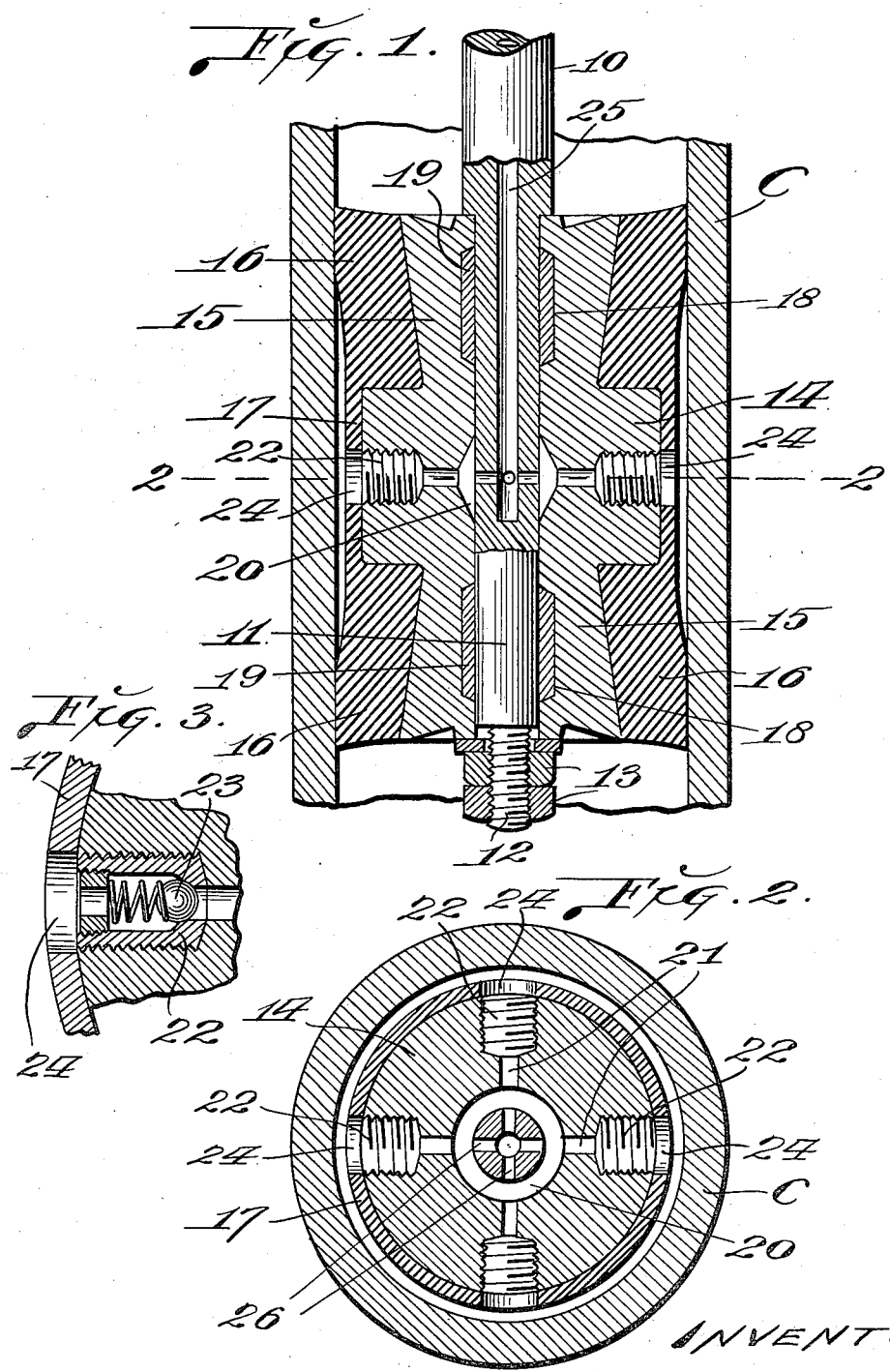
INVENTOR,
HENRY C. RIES.

Patented July 1, 1930

1,768,633

UNITED STATES PATENT OFFICE

HENRY C. RIES, OF LONG BEACH, CALIFORNIA

PISTON FOR OIL-WELL CIRCULATION PUMPS

Application filed June 3, 1929. Serial No. 368,152.

My invention relates to a piston that is especially designed for use in connection with oil well circulation pumps and the principal object of my invention is, to provide simple and efficient means for lubricating the piston and particularly that portion that is in direct contact with the inner face of the cylinder wall.

Further objects of my invention are, to generally improve upon and simplify the construction of the existing forms of circulation pump pistons, further, to provide an improved structure whereby a liquid lubricant is conducted through the piston rod and thence through the body of the piston to the intermediate portion of the external surface of said piston, and further, to provide a piston of the character referred to that is relatively simple in construction, inexpensive of manufacture and which may be readily assembled or taken apart, thereby facilitating assembly and repairs.

With the foregoing and other objects in view, my invention consists in certain novel features of construction and arrangement of parts that will hereinafter be more fully described and claimed and illustrated in the accompanying drawings, in which:

Fig. 1 is a vertical section taken lengthwise through the center of a piston constructed in accordance with my invention.

Fig. 2 is a horizontal section taken on the line 2—2 of Fig. 1.

Fig. 3 is an enlarged detail section taken through the center of one of the check valves utilized in my improved piston.

Referring by numerals to the accompanying drawings which illustrate a practical embodiment of my invention, 10 designates a piston rod having a slightly reduced end portion 11, and projecting from the end of this reduced portion 11 is a threaded stem 12.

Mounted on the reduced portion 11 of the piston and rigidly secured thereto by means of nuts 13 that are threaded on the stem 12 is a piston body 14 of metal, and projecting from the ends of said body are extensions 15 which are somewhat smaller in diameter than the body 14 and said reduced end portions are tapered so that they gradually increase in diameter toward the outer ends.

Positioned on the tapered end portions 15 of the piston body are relatively heavy or thick packing rings 16 of rubber or composition having rubber as a principal ingredient and overlying the periphery of the piston a body 14 is a layer 17 of rubber that is vulcanized to the inner outer corners of the rings 16.

Formed within the tapered end portions 15 of the piston body and communicating with the axial bore receiving the reduced portion 11 of the piston rod are circumferential grooves or pockets 18 that are filled with metal packing 19, preferably lead.

Formed within the piston body 14 and communicating with the axial bore that receives the reduced end 11 of the piston is a circumferential groove or shallow chamber 20 and leading therefrom are radially disposed ducts 21, the outer ends of which communicate with the openings through check valve housings 22, the latter being seated in the outer portion of the piston body 14.

Arranged within each valve housing 22 is an outwardly opening spring held check valve 23 and formed in the layer of rubber 17 that overlies the piston body 14 are openings 24 that coincide with the outer ends of the valve housings 22 (see Fig. 3).

Formed in the piston rod 10 is an axial bore 25 and leading from the end thereof outwardly through the reduced portion 11 of the piston rod are radial ducts 26 that communicate with the groove or chamber 20 on the interior of the piston body 14.

As the piston is reciprocated within the pump cylinder C the water or "mud" that is circulated through a well and the drill tube will be forcibly drawn into and expanded from the pump cylinder in the usual manner and while the piston is in operation a suitable liquid lubricant which may be oil or water, is forced under pressure through the axial duct 25 and this liquid lubricant will be forced outwardly through ducts 26 into chamber 20 and from said chamber the lubricant will discharge outwardly through ducts 21 and thence through the housings containing the check valves 23 which are forced outwardly under pressure of the liquid lubricant and the latter is finally discharged through the openings 24 into the relatively narrow space between the intermediate portion of the piston and the inner surface of the wall of cylinder C, thereby effectively lubricating the piston during its operation.

Owing to the taper of the end portions 15 of the piston body, the outer end portions of the packing rings 16 are pressed into contact with the inner face of the cylinder wall and as the external diameter of the covering 17 is slightly less than the internal diameter of the cylinder a relatively narrow space is formed around the intermediate portion of the piston and by my improved construction this space is constantly filled with liquid lubricant, thereby insuring ample lubrication for those portions of the piston that are in contact with the cylinder wall.

The soft metal packing rings 19 prevent liquid lubricant from leaking through the joint between the reduced end portion 11 of the piston rod and the body of the piston and the check valves 23 permit the liquid lubricant to only flow outwardly through the ducts that lead to the narrow space surrounding the intermediate portion of the piston.

Thus it will be seen that I have provided means for effectively lubricating pump pistons and especially those pistons that are utilized for circulating water or mud through a deep well and the drilling line that is operating therein.

It will be understood that minor changes in the size, form and construction of the various parts of my improved piston may be made and substituted for those herein shown and described without departing from the spirit of my invention, the scope of which is set forth in the appended claims.

I claim as my invention:

1. In a piston for oil well circulation pumps, a piston body having reduced tapered end portions, compressible packing rings located on said reduced tapered end portions, a piston rod extending axially through the piston body, soft metal packing rings arranged between the piston body and the portion of the piston rod that passes therethrough and lubricant circulation ducts formed in said piston rod and piston body.

2. In a piston for oil well circulation pumps, a piston body having reduced tapered end portions, compressible packing rings located on said reduced tapered end portions, a piston rod extending axially through the piston body, soft metal packing rings arranged between the piston body and the portion of the piston rod that passes therethrough, lubricant circulation ducts formed in said piston rod and piston body and outwardly opening check valves located in the ducts that are formed in the body of the piston.

3. In an oil well circulation pump piston, a piston body having reduced end portions, packing rings mounted on said reduced end portions, a layer of packing material covering the intermediate portion of the body of the piston and connected to said packing rings, which layer is provided with openings, a piston rod passing axially through the body of the piston, circulation ducts formed through said piston rod and piston body and outwardly opening spring held check valves located in the ducts in the piston body, which check valves coincide with the openings in the layer of material on the intermediate portion of the piston body.

In testimony whereof I affix my signature.

HENRY C. RIES.